United States Patent Office 2,726,503
Patented Dec. 13, 1955

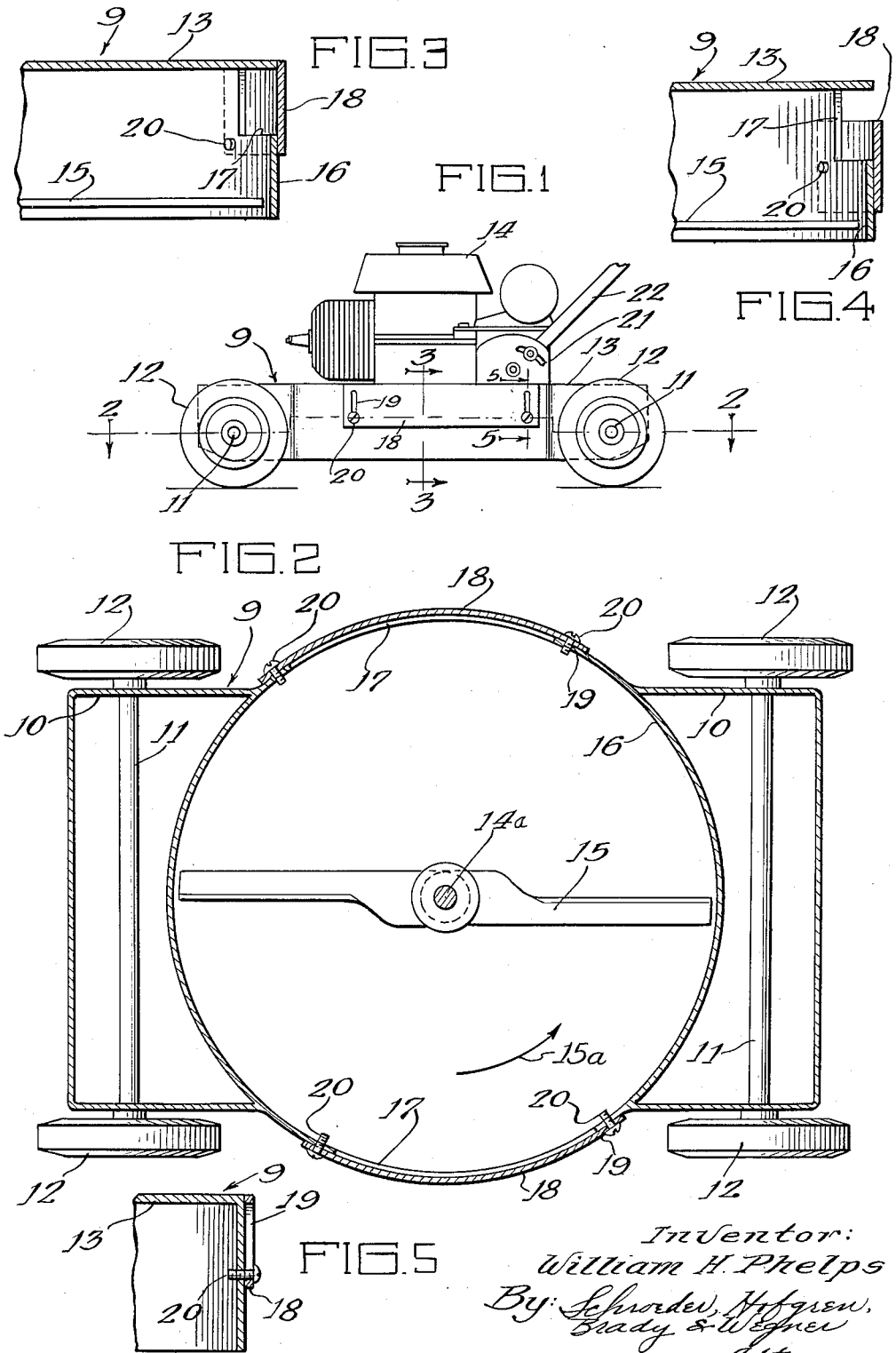

2,726,503

ROTARY POWER MOWER

William H. Phelps, Ralston, Nebr.

Application March 8, 1955, Serial No. 492,867

9 Claims. (Cl. 56—25.4)

This invention relates to a power mower of the rotary type, and in particular it relates to a rotary mower which is provided with a pair of circumferentially extending clipping discharge openings on opposite sides of the skirt each of which is provided with a slidable closure which may be adjusted between a fully open position and a fully closed position of the opening.

The principal object of the invention is to provide a mower which may be very inexpensively produced using a frame and guard skirt of cast aluminum, fabricated steel or fiberglass.

A further object of the invention is to provide a rotary mower which may be adjusted by the operator to fit a wide variety of operating conditions.

Yet another object of the invention is to provide a rotary mower in which upwards of 90% of the clippings may be discharged through the openings in the guard skirt surrounding the blade, rather than being dropped back into the freshly cut grass.

Yet another object of the invention is to provide a mower in which the clipping discharge openings are so positioned that the centrifugal force of the clippings being whirled in the air stream above the mower blade may discharge the clippings with substantial force.

Still another object of the invention is to provide a mower in which the openings for clipping discharge are entirely above the plane of the blade, so as not to interfere with the guard function of the skirt which surrounds the blade.

The invention is illustrated in a preferred embodiment in the accompanying drawings in which:

Fig. 1 is a side elevational view of a mower embodying the invention;

Fig. 2 is a sectional view on an enlarged scale taken as indicated along the line 2—2 of Fig. 1;

Fig. 3 is a fragmentary section on an enlarged scale taken as indicated along the line 3—3 of Fig. 1;

Fig. 4 is a view like Fig. 3 with the closure partly open; and

Fig. 5 is a fragmentary section on an enlarged scale taken as indicated along the line 5—5 of Fig. 1.

Referring to the drawings in greater detail, and referring first to Fig. 1, the mower has a frame indicated generally at 9 having upright rectangular end members 10 to support transversely extending axles 11 on which are mounted supporting wheels 12. The frame 9 has a closed top 13 on top of which is mounted a motor 14 which has a shaft 14a extending through an opening in the solid top 13 to receive a blade 15 (see Fig. 2).

Surrounding the blade is a depending guard skirt 16 which is circular so as to closely embrace the blade tips and which has its lower margin beneath the level of the blade 15 so as to fully enclose the blade.

At the two sides of the guard skirt 16, between the wheels, are clipping discharge openings 17 each of which extends about 65° around the circumference of the skirt 16 so as to provide a circumferentially elongated opening of substantial size. Because of the locations of the wheels 12, it is not practical to extend the openings 17 for more than about 90°.

Covering the openings 17 are a pair of vertically slidable closure members 18 which, as best seen in Fig. 4, have adjacent their ends upright slots 19 so that they may be secured to the skirt 16 by bolts 20 in any desired adjusted position between a position in which the discharge openings 17 are fully closed, and a position in which said openings are fully open. Thus, for example, Fig. 3 shows one of the closures 18 in fully closed position, while Fig. 4 shows the closure moved about halfway to fully open position. Opening the closures 18 downwardly as seen in Fig. 4 permits use of the openings without substantially interferring with the guard function of skirt 16, since the lower margins of the openings 17 and are well above the plane of the blade 15.

As seen in Fig. 1, the mower is provided with brackets 21 for adjustable handles 22.

A machine of the present type has been found to suck the clippings into the space between the blade and the closed top 13 of the frame 10, where a very large percentage of the clippings whirl around inside the skirt. In fact, with the closures 18 shut a mower of the present type may be operated in heavy grass so as to get a large load of clippings above the blade, and may be tipped on its side with the motor still running to show the action of the clippings in the space above the blade; and almost no clippings drop out through the blade.

The combination of air movement above the rotating blade, with the centrifugal force imparted to the clippings by the rotary air stream, permits the clippings to be discharged through the side openings 17 with considerable velocity. Generally speaking, the longer and coarser the grass which is being mowed the larger the discharge opening which is necessary. Thus, the fully adjustable closures 18 for the clipping discharge openings 17 permit the mower to be adjusted quite closely to the particular mowing conditions encountered. A mower may be operated either with one discharge partly open or fully open, or both discharges partly open or fully open, or both discharges fully closed, depending on conditions. For example, in leaf mulching it has been found that a machine does a better job with the closures 18 moved down about ¼ inch from the platform 13; while for other types of work openings of other sizes are more desirable and more ecient. It is to be noted that the openings 17 are not centered between the wheels, but rather are longitudinally offset in opposite directions. The arrow 15a in Fig. 2 shows the direction of rotation of the blade, and shows that each opening is offset toward the end where the blade is moving toward it. This gives more efficient discharge than if the openings were centered between the wheels.

The foregoing detailed description is given for clearness of understanding only and no unnecessary limitations are to be understood therefrom, as some modifications will be obvious to those skilled in the art.

I claim:

1. In a power mower having a solid topped wheeled frame and a driven horizontal blade beneath the frame: a depending substantially circular guard skirt on the frame having its lower margin below the plane of the blade; a circumferentially elongated opening in the skirt above the blade; and a slidably mounted closure covering said opening, said closure being adjustable to any location between a fully open position and a fully closed position of the opening.

2. In a power mower having a solid topped wheeled frame and a driven horizontal blade beneath the frame: a depending substantially circular guard skirt on the frame having its lower margin below the plane of the blade; a circumferentially elongated opening in the skirt above the blade, said opening extending more than 60° and less than 90° about the skirt; and a slidably mounted closure covering said opening, said closure being adjustable to any location between a fully open position and a fully closed position of the opening.

3. In a power mower having a solid topped wheeled frame and a driven horizontal blade beneath the frame: a depending substantially circular guard skirt on the frame having its lower margin below the plane of the blade; a circumferentially elongated opening in the skirt above the blade; and a vertically slidable closure covering said opening, said closure being adjustable to any location between a fully open position and a fully closed position of the opening.

4. The device of claim 3 in which the closure may slide downwardly from its fully closed position, so at to maintain the largest possible distance between the lower margin of the available opening and the plane of the blade.

5. In a power mower having a solid topped wheeled frame and a driven horizontal blade beneath the frame: a depending substantially circular guard skirt on the frame having its lower margin below the plane of the blade; a pair of circumferentially elongated openings on opposite sides of the skirt above the blade; and a slidably mounted closure covering each of said openings, each closure being adjustable between a fully open position and a fully closed position of the opening.

6. In a power mower having a solid topped wheeled frame and a driven horizontal blade beneath the frame: a depending substantially circular guard skirt on the frame having its lower margin below the plane of the blade; a pair of circumferentially elongated openings on opposite sides of the skirt above the blade; and a vertically slidable closure covering each of said openings, each closure being adjustable between a fully open position and a fully closed position of the opening.

7. In a power mower having a solid topped wheeled frame and a driven horizontally rotatable blade beneath the frame with its axis at the center of the frame: a depending substantially circular guard skirt on the frame closely embracing the blade which has its lower margin below the plane of the blade; a circumferentially elongated opening in the skirt which extends longitudinally of the frame, said opening being offset longitudinally with respect to the transverse median line of the frame so as to be near that portion of the blade which moves toward the opening; and a slidably mounted closure covering said opening, said closure being adjustable to any location between a fully open position and a fully closed position of the opening.

8. In a power mower having a solid topped wheeled frame and a driven horizontally rotatable blade beneath the frame with its axis at the center of the frame: a depending substantially circular guard skirt on the frame closely embracing the blade which has its lower margin below the plane of the blade; a circumferentially elongated opening in each side of the skirt which extends longitudinally of the frame, each of said openings being offset longitudinally with respect to the transverse median line of the frame so as to be near that portion of the blade which moves toward the opening; and a slidably mounted closure covering each of said openings, said closures being adjustable to any location between a fully open position and a fully closed position of the opening.

9. In a power mower having a solid topped wheeled frame and a driven horizontal blade beneath the frame; a depending substantially circular guard skirt on the frame having its lower margin below the plane of the blade; a circumferentially elongated opening in the skirt above the blade; and an adjustably mounted closure covering said opening, said closure being adjustable to several different locations between a fully open position and a fully closed position of the opening.

No references cited.